US010263402B2

(12) United States Patent
Niles et al.

(10) Patent No.: US 10,263,402 B2
(45) Date of Patent: Apr. 16, 2019

(54) CONDUCTOR COVER APPLICATOR

(71) Applicant: Cantega Technologies Inc., Edmonton (CA)

(72) Inventors: Martin S. Niles, Stony Plain (CA); Edmond LeRouzic, Edmonton (CA); Scott Young, Edmonton (CA); Keith I Yeats, Edmonton (CA)

(73) Assignee: Cantega Technologies Inc., Edmonton, Alberta (CA)

( * ) Notice: Subject to any disclaimer, the term of this patent is extended or adjusted under 35 U.S.C. 154(b) by 438 days.

(21) Appl. No.: 14/867,694

(22) Filed: Sep. 28, 2015

(65) Prior Publication Data

US 2016/0155545 A1    Jun. 2, 2016

Related U.S. Application Data

(60) Provisional application No. 62/085,312, filed on Nov. 27, 2014.

(51) Int. Cl.
*H01B 13/06* (2006.01)
*H02G 1/08* (2006.01)
*H02G 3/04* (2006.01)

(52) U.S. Cl.
CPC ........... *H02G 1/085* (2013.01); *H02G 3/0481* (2013.01)

(58) Field of Classification Search
CPC .............................. H02G 1/085; H02G 3/0481
See application file for complete search history.

(56) References Cited

U.S. PATENT DOCUMENTS 1,485,994 A    3/1924  Salisbury
3,017,905 A    1/1962  Klein
(Continued)

OTHER PUBLICATIONS

Salisbury Insulation Covers—STINGER Covers, catalog, published as early as Nov. 21, 2008, 2 pages.
(Continued)

*Primary Examiner* — John C Hong
(74) *Attorney, Agent, or Firm* — Anthony R. Lambert

(57) ABSTRACT

Methods and applicators for applying tubular conductor cover to a cable. The applicator may retain a user's hand. The applicators may stop a user's hand from moving relative to the applicator in a direction opposed to a path of conductor cover passage through the applicator. An applicator for applying a tubular conductor cover to a cable, the conductor cover being split longitudinally to define a first longitudinal edge and a second longitudinal edge, the applicator comprising: a separator shaped to contact, in operation of the applicator, an interior surface of the conductor cover to spread open the first longitudinal edge and the second longitudinal edge along a portion of the conductor cover to allow the portion of the conductor cover to be applied to a cable; and a hand retainer connected to or forming part of the separator. A method of applying tubular conductor cover to a cable, the conductor cover being split longitudinally to define a first longitudinal edge and a second longitudinal edge, the method comprising: positioning a hand in a hand retainer connected to or forming part of a separator; spreading open the first longitudinal edge and the second longitudinal edge of a portion of the conductor cover with a separator, the separator contacting an interior surface of the conductor cover; and applying a length of conductor cover to the cable through the separator.

24 Claims, 15 Drawing Sheets

(56) References Cited

U.S. PATENT DOCUMENTS

| | | | |
|---|---|---|---|
| 3,133,984 | A | 5/1964 | Berwick et al. |
| 3,600,784 | A | 8/1971 | Neagle et al. |
| 3,712,261 | A | 1/1973 | McLelland et al. |
| 3,900,698 | A | 8/1975 | Sanji |
| 5,690,210 | A * | 11/1997 | Layne .................. B65G 17/086 198/853 |
| 5,796,032 | A | 8/1998 | Hadley |
| 6,195,861 | B1 | 3/2001 | Frye et al. |
| 6,227,251 | B1 | 3/2001 | Ahn et al. |
| 6,730,852 | B1 | 5/2004 | Puigcerver et al. |
| 7,721,459 | B2 | 5/2010 | Niles |
| 7,839,256 | B2 | 11/2010 | Bradford |
| 8,621,735 | B2 | 1/2014 | Niles et al. |
| 8,957,314 | B2 | 2/2015 | Niles et al. |
| 8,969,721 | B2 | 3/2015 | Morin et al. |
| 9,004,562 | B2 | 4/2015 | Morin et al. |
| 9,102,043 | B2 | 8/2015 | Morin et al. |
| 9,431,157 | B2 | 8/2016 | Niles |
| 2011/0019902 | A1 | 1/2011 | Niles |
| 2011/0083783 | A1 | 4/2011 | Niles et al. |
| 2012/0284997 | A1 | 11/2012 | Morin et al. |
| 2015/0068798 | A1 | 3/2015 | Niles et al. |
| 2015/0130200 | A1 | 5/2015 | Niles et al. |
| 2016/0035464 | A1 | 2/2016 | Niles et al. |

OTHER PUBLICATIONS

Salisbury Outage Protection, brochure, published at least as early as Nov. 21, 2008, 32 pages.

Salisbury product catalog, published at least as early as Nov. 21, 2008, 142 pages.

PCT international search report for International application No. PCT/CA2010/001590, dated Feb. 8, 2011, 7 pages.

Hubbell Power Systems Grip-All Clampsticks, catalog, Aug. 2009, 1 page.

Salisbury Universal Hotstick Applicator and Instant Insulation, URL=http://www.salisburybyhoneywell.com/en-US/Pages/Product.aspx?category=Instant%20Insulation&cat=HLS-HES&pid=Instant_insulation_applicator, accessed on Dec. 4, 2012, 1 page.

Distribution Industrielle GC, Spring clamp with hot stick installation eyes for isolating blanket, URL=https://www.distgc.com/product.php?ProductID=2082&UILanguage=EN, believed to be available at least before Jan. 20, 2014, 2 pages.

Downloaded from www.techflex.com; Using the F6 Tool; Techflex—Working Effectively With F6 Tool; downloaded on Jan. 25, 2017 but believed to be available before the filing date; p. 1-2.

Downloaded from www.hellmemanntyton.com; Helawrap Cable Cover HWPP16L2; Helawrap HWPP, Article No. 161-64204; downloaded on Jan. 24, 2017, but believed to be available before the filing date; p. 1-3.

Downloaded from www.aliexpress.com; 22mm 5m Spiral Cable Wire Wrap Tube Computer Manage Cord Cable Sleeves Sprial Flexible PE Cable Sleeve; downloaded on Nov. 28, 2017 but believed to be available before the filing date; p. 1-5.

Downloaded from www.painlessperformance.com; Powerbraid Tool Assistance Kit; downloaded on Jan. 4, 2017 but believed to be available before the filing date; p. 1-2.

* cited by examiner

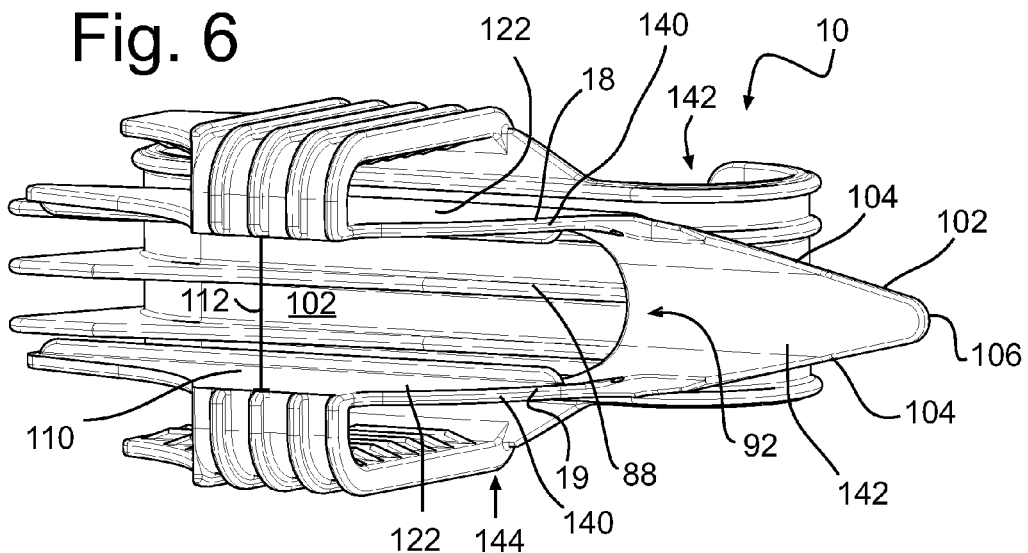
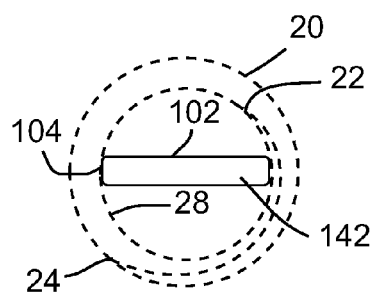
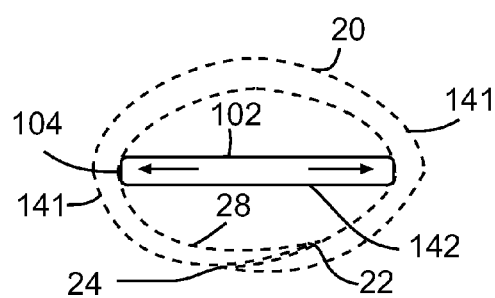
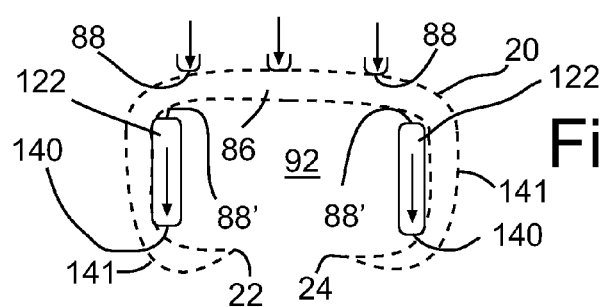

Fig. 17
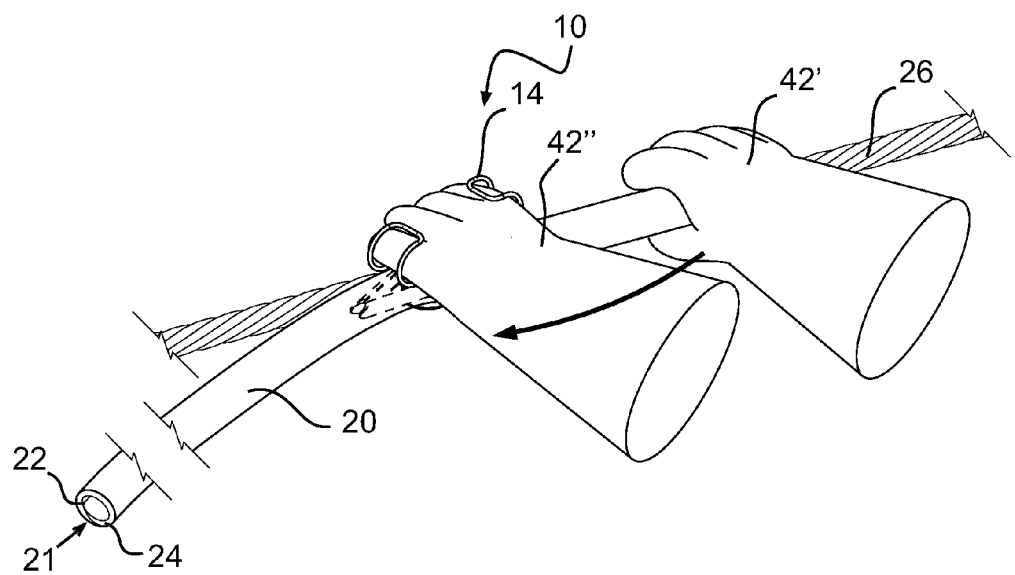
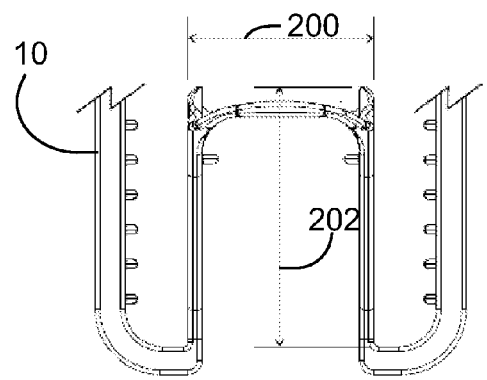
Fig. 18
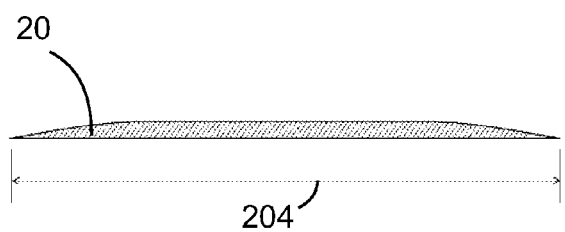
Fig. 19

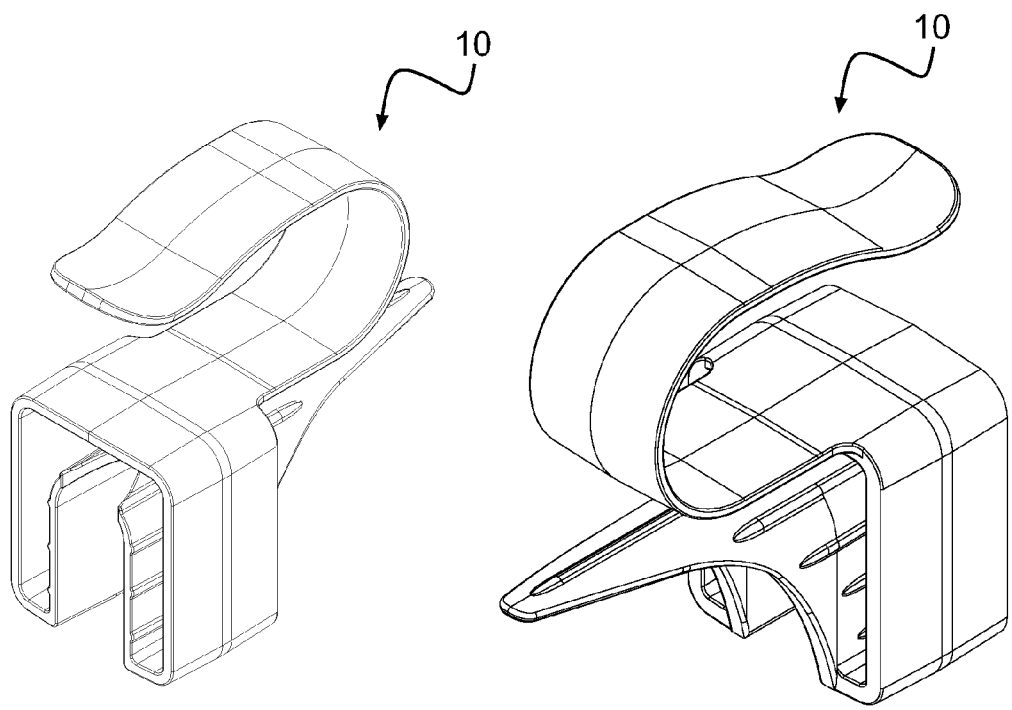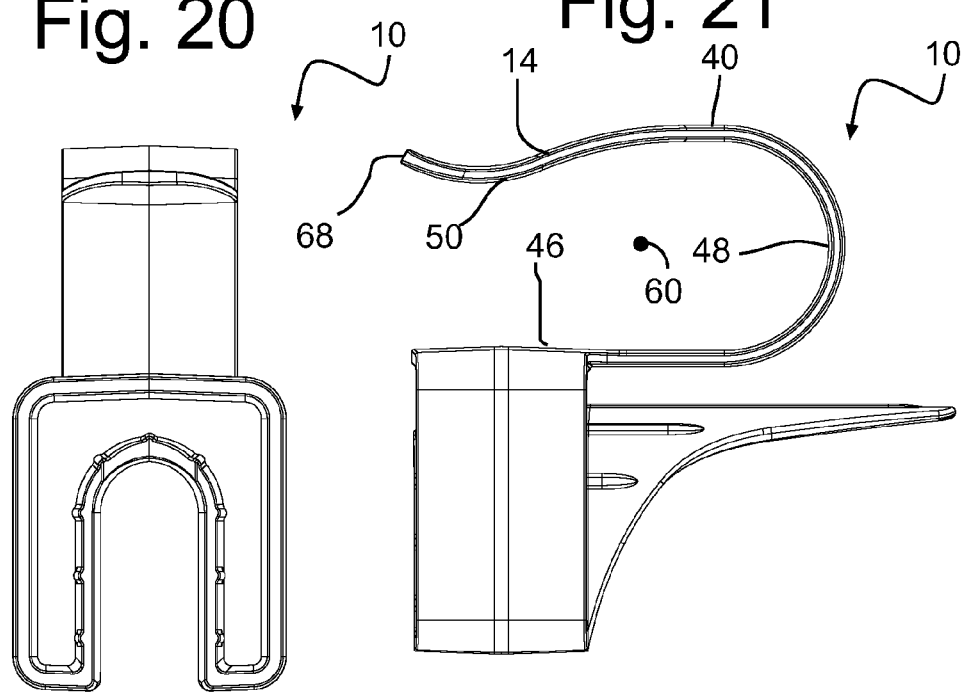
Fig. 20  Fig. 21  Fig. 22  Fig. 23

CONDUCTOR COVER APPLICATOR

TECHNICAL FIELD

This document relates to the field of applying conductor cover.

BACKGROUND

Conductor cover may be installed over cables in order to protect energized cables from wildlife and other incidental contact that may cause power system faults or outages. Conductor covers such as Instant Insulation or Stinger Covers sold by Salisbury are examples of the type of cover used in the industry for this purpose. One type of applicator used in the industry for applying such cover on energized conductor is the 2494 applicator, also sold by Salisbury. Another type of applicator is disclosed in U.S. Pat. No. 8,621,735.

SUMMARY

Methods and applicators are disclosed for applying tubular conductor cover to a cable.

The applicator may retain a user's hand. The applicators may stop a user's hand from moving relative to the applicator in a direction opposed to a path of conductor cover passage through the applicator. A shoulder may be provided to allow a user to apply force to the shoulder and advance the applicator through conductor cover to apply the cover to a cable.

An applicator is disclosed for applying a tubular conductor cover to a cable, the conductor cover being split longitudinally to define a first longitudinal edge and a second longitudinal edge, the applicator comprising: a separator shaped to contact, in operation of the applicator, an interior surface of the conductor cover to spread open the first longitudinal edge and the second longitudinal edge along a portion of the conductor cover to allow the portion of the conductor cover to be applied to a cable; and a hand retainer connected to or forming part of the separator.

A method is disclosed of applying tubular conductor cover to a cable, the conductor cover being split longitudinally to define a first longitudinal edge and a second longitudinal edge, the method comprising: positioning a hand in a hand retainer connected to or forming part of a separator; spreading open the first longitudinal edge and the second longitudinal edge of a portion of the conductor cover with a separator, the separator contacting an interior surface of the conductor cover; and applying a length of conductor cover to the cable through the separator.

The applicator may use plural distinct movements to separate and uncurl the cover for entry into a channel for the cover.

In various embodiments, there may be included any one or more of the following features: The hand retainer comprises a base, a first side member extended from the base, and a first top member extended from the first side member over the base. The hand retainer comprises a second side member extended from the base, and a second top member extended from the second side member over the base, the second side member being spaced from the first side member to define a hand gap. The hand retainer has a first part that is C-shaped to receive a hand. The hand retainer has a second part that is C-shaped to receive the hand. The first part and the second part are opposed to one another to define a hand gap. The separator defines a path of conductor cover travel, and the hand retainer comprises a stop that prevents hand movement in a direction from a cover exit end to a cover entry end of the applicator, the direction being parallel to the path of conductor cover travel. A normal to the stop is parallel to the path of conductor cover travel. The hand retainer comprises one or more members that define an open ended hand receptacle. The separator defines a U-channel contoured to fit the portion of the conductor cover, and the separator comprises a middle part and two arm parts that extend from the middle part, the middle part defining at least part of a base of the U-channel and the two arm parts defining at least part of respective arms of the U-channel, the hand retainer being connected to or forming part of the middle part. The separator comprises longitudinal ridges for contacting the conductor cover. The hand retainer comprises one or more members that define an open ended hand receptacle, and in which positioning a hand in the hand retainer further comprises inserting the hand into the open ended hand receptacle.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 6 is a bottom perspective view of the applicator of FIG. 1;

FIGS. 6A-C are a sequence of section views taken along the 6A, 6B, and 6C section lines, respectively, from FIG. 3, with the orientation and position of a conductor cover illustrated with dashed lines, and with applicator and conductor cover dimensions not to scale;

FIGS. 9-17 illustrate a method of applying conductor cover to a conductor cable using the applicator of FIG. 7.

FIG. 18 is an end view of the applicator of FIG. 1.

FIG. 19 is a cross section view of conductor cover in a flattened position.

FIGS. 20 and 21 are perspective views of the top of the embodiment of a conductor cover applicator.

FIG. 22 is an end view of the exit end of the conductor cover applicator of FIG. 20.

FIG. 23 is a side elevation view of the conductor cover applicator of FIG. 20.

DETAILED DESCRIPTION

Immaterial modifications may be made to the embodiments described here without departing from what is covered by the claims.

Conductor cover may be installed over cables in order to protect energized cables from wildlife and other incidental contact that may cause power system faults or outages. Conductor covers such as Instant Insulation or Stinger Covers sold by Salisbury are examples of the type of cover used in the industry for this purpose. There are three basic work methods for applying conductor cover: application to a grounded (de-energized) system; application by a worker using rubber gloves to apply the conductor cover to a system that could be energized or de-energized; and application by a worker using a hot stick to apply the conductor cover to an energized or de-energized system. Using rubber gloves is awkward and difficult due to the thick resilient plastic incorporated into the rubber gloves. The hot stick method eliminates the risks to workers of working in the vicinity of energized components such as lightning arrestors and fused disconnects. Unfortunately, applying conductor cover over a cable is often difficult to accomplish, as the cover may be resilient in nature and awkward to handle. Also, the conductor is often free to move during installation and this can pose a risk to the individual applying the cover and/or to the energized system.

One type of applicator used in the industry for applying such cover on energized conductor is the 2494 applicator, also sold by Salisbury. The 2494 applicator has two rigid closely-parallel prongs attached to one another at both ends. To install the conductor cover on a cable, one end of the Instant Insulation or other conductor cover is first flattened and inserted in between the applicator prongs. The prongs are then rolled to coil the insulation around the prongs. The prongs hold the cover flat, and a user can then place the flattened cover over a cable by unrolling the cover onto the cable.

Another type of applicator is disclosed in U.S. Pat. No. 8,621,735, and may be used with a hot stick. A drive system and rollers may be used to draw conductor cover through a head onto a cable. The applicator may have a hand-grip or handle on the head.

Tubular conductor covers, such as resilient conductor covers, may be applied to electric cables as a permanent cover to protect against outages caused by weather, trees and animals. Conductor covers typically resist ozone and ultraviolet deterioration, while remaining flexible even at low temperatures. Conductor covers may be made from resilient material, in order to stay firmly wrapped around an energized cable after application. Conductor covers are made from, for example, SALCOR elastomer, silicon rubber tubing, or other polymeric material. Conductor covers are generally dielectrics that act as a barrier to prevent the inadvertent transfer of electrical energy from the cable.

Figure 5:
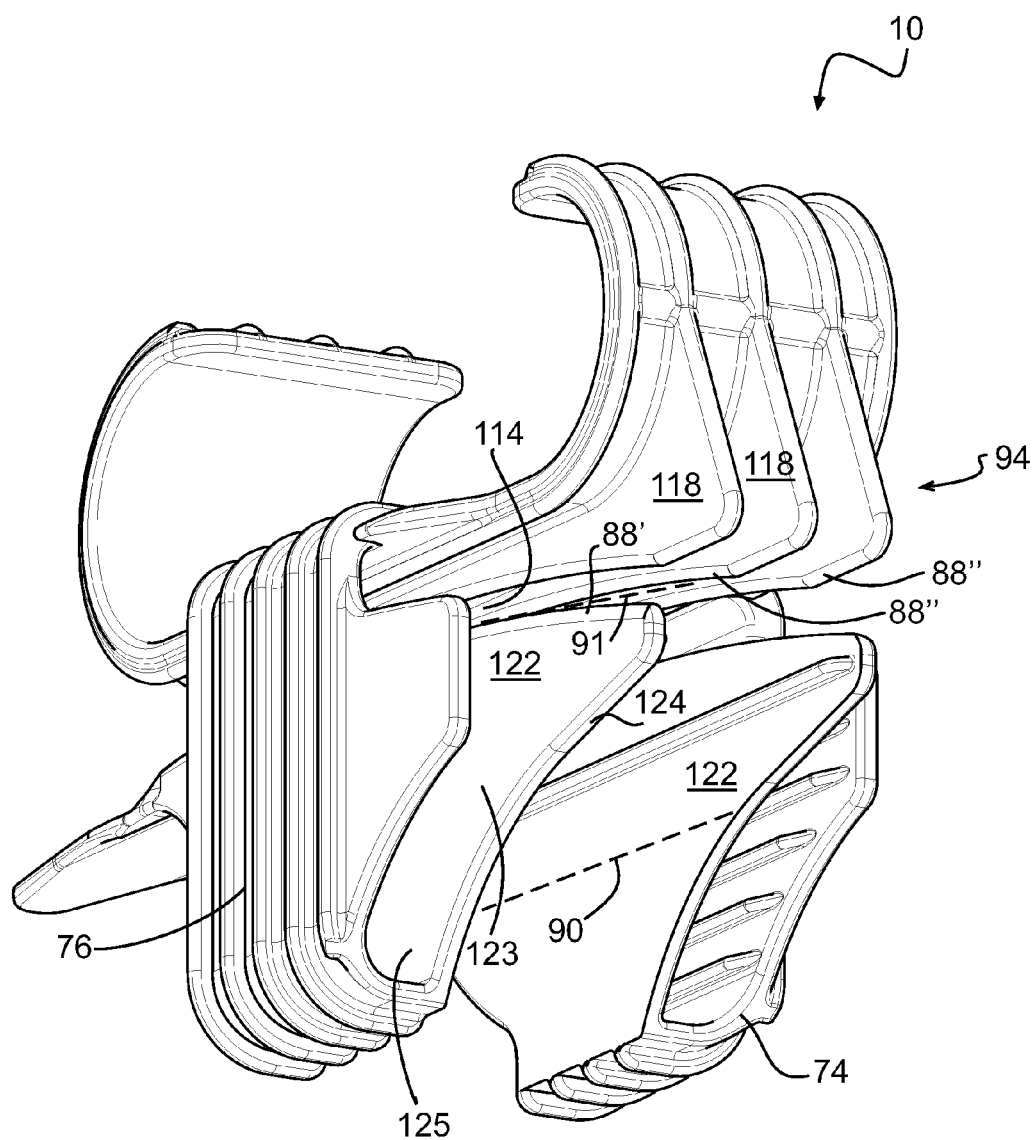
FIG. 5 is a rear perspective view of the applicator of FIG. 1.

FIG. 17 illustrates one type of conductor cover 20. Referring to FIG. 5, a cover 20 is illustrated as split longitudinally to form an overlapping portion 21 defined by longitudinal ends 22 and 24. This type of cover 20 can typically be installed and secured to a cable 26 with zero or very little extra fastening. Another type of cover (not shown) may be split longitudinally such that first and second longitudinal ends 22 and 24 define respective flanges that provide surfaces through which fasteners may be used to secure the flanges together. Another type of cover (not shown) may be a regular tube of material sliced longitudinally and radially down the side such that first and second longitudinal ends 22 and 24 contact one another. Other cover types may be used with the applicators and methods disclosed herein, including heavy and light duty cover. Also, this document should not be limited to conductor cover brands or materials of construction presently on the market. With some types of cover, tape and/or tie wraps may be required as a fastener to secure the cover in place after application.

Figure 1:
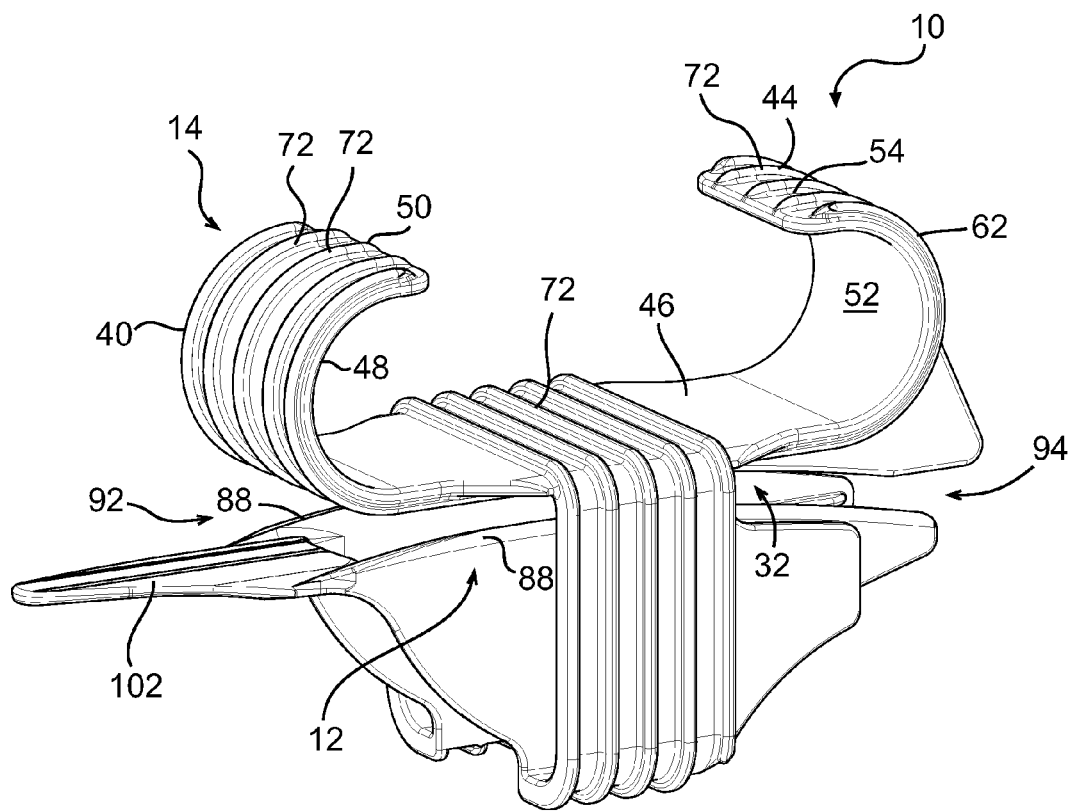
FIG. 1 is a side perspective view of a conductor cover applicator.
Figure 4:
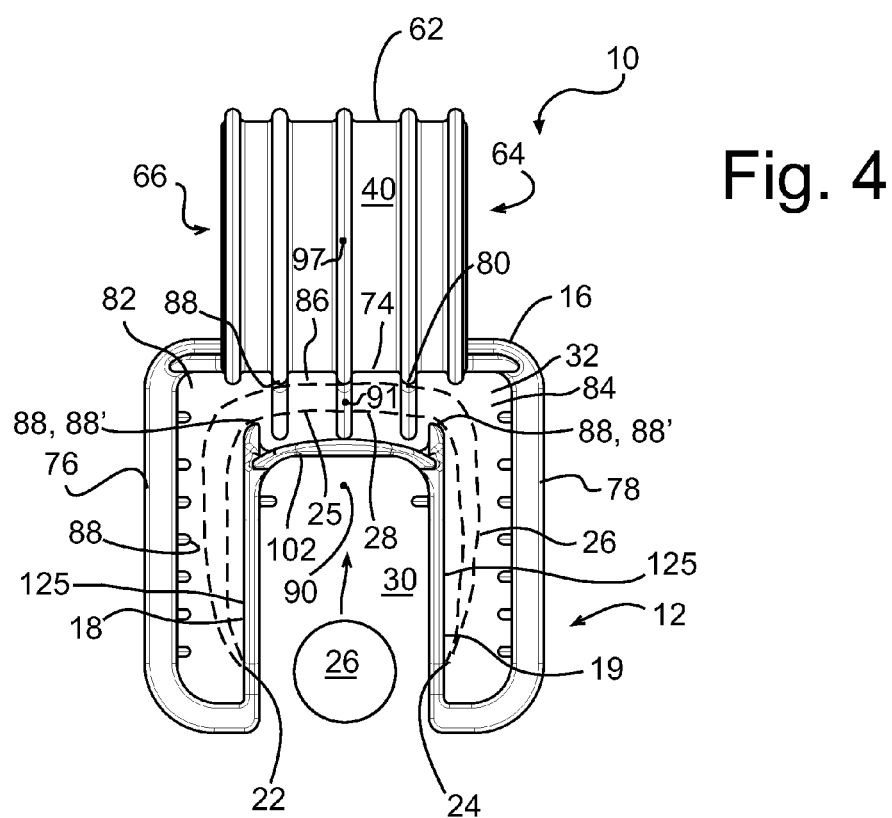
FIG. 4 is an end view of the applicator of FIG. 1, with an outline of a conductor cover inserted in the applicator.

Referring to FIG. 1, an applicator 10 for applying a tubular conductor cover 20, such as a resilient tubular conductor cover, to a cable 26 is illustrated. Applicator 10 comprises a separator 12 and a hand retainer 14. Referring to FIG. 4, the separator 12 may be located on a head 16. Separator 12 may comprise two or more separating elements 18, 19. Elements 18, 19 may be surfaces, of the separator 12, that may be oriented away from one another as shown. Head 16 may be made out of various materials, for example steel, aluminum, or carbon fiber. Head 16 may be partly or completely constructed of dielectric materials.

The separator 12 is shaped to contact an interior surface 28 of the conductor cover 20 to spread open or maintain the first longitudinal edge 22 and the second longitudinal edge 24 along a portion 25 of the conductor cover 20 to allow the portion 25 of the conductor cover 20 to be applied to a cable 26, when the applicator 10 is in operation. In some embodiments such as the one illustrated in FIG. 4, separating elements 18 and 19 may be spaced to contact interior surface 28. In the embodiment illustrated, the separating elements 18, 19 are defined by a pair of inwardly wrapped arms connected to head 16. A cable passage 30 may also be at least partially defined by the separator, for example between the separating elements 18, 19. The separating elements 18 and 19 may be integrally connected, for example as shown where separating elements 18 and 19 form channel 32, which may be U-shaped and contoured to fit the portion 25 of the conductor cover 20. Channel 32 allows a lateral cross-section of the portion 25 of the conductor cover 20 to be held open by applicator 10, so that a suitable length of conductor cover 20 may be fed through the separator 12. The U-shaped channel 32 may have the shape of an alphabetical U with curved sides, or may have the shape of a boxy U as shown with sharp corners, straight sides and without curves.

Figure 8:
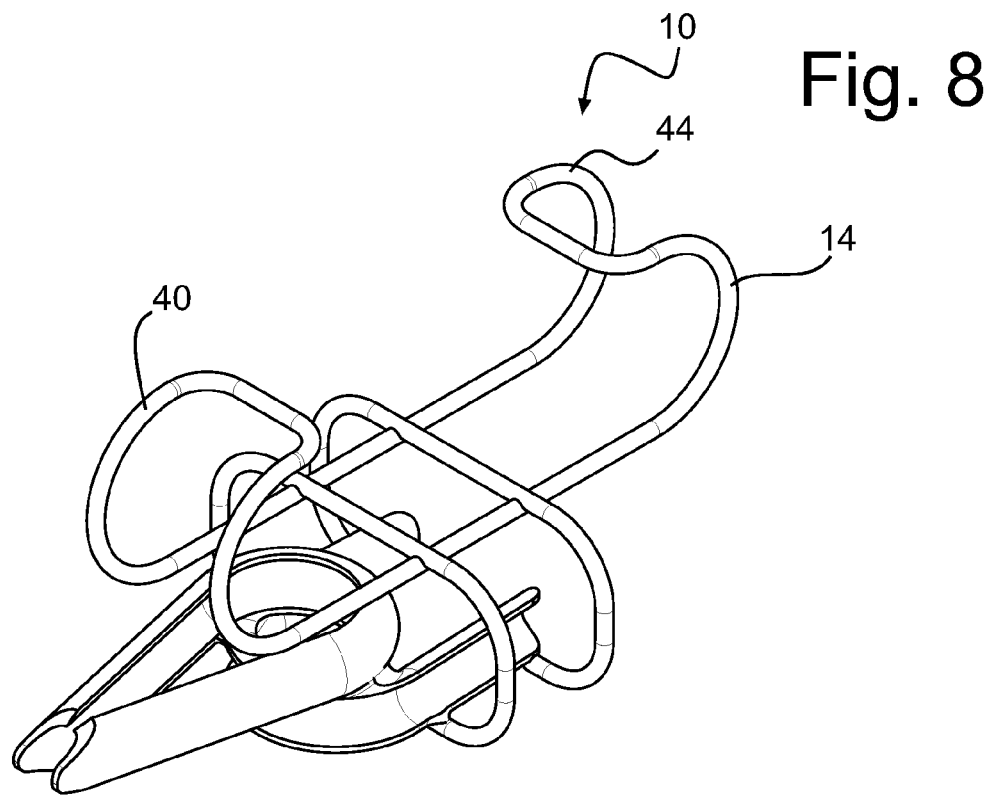
FIG. 8 is a top perspective view of the applicator of FIG. 7.
Figure 9:
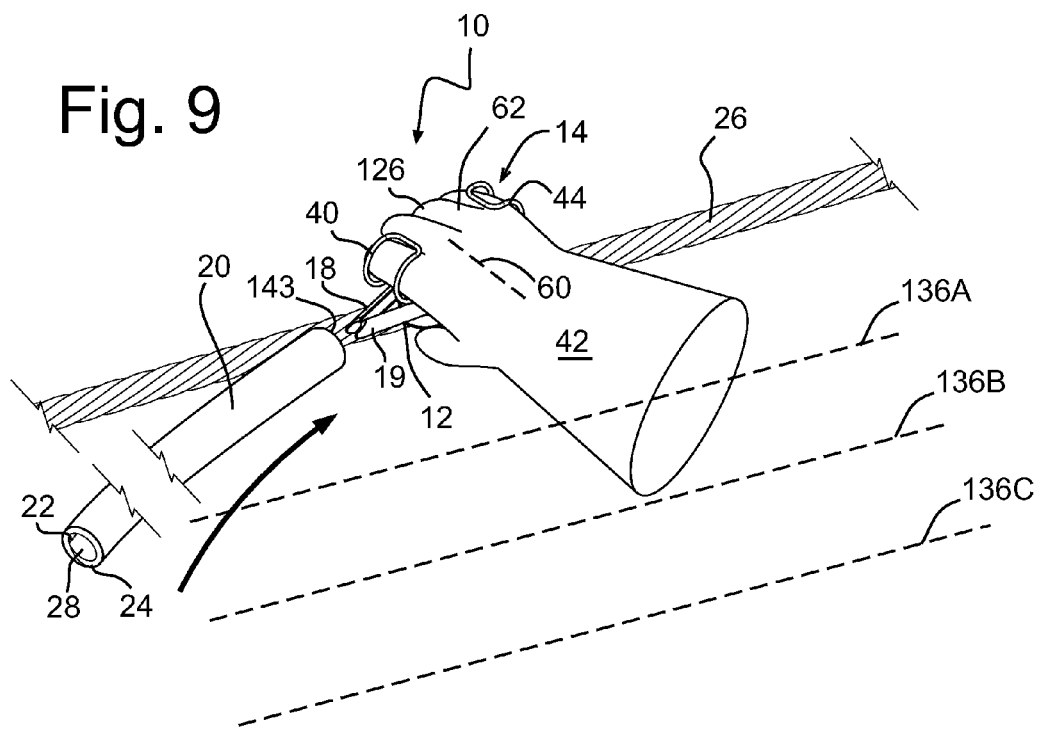

Referring to FIGS. 1, 8, and 9, two embodiments of applicators 10 are shown. Both have a hand retainer 14 connected to or forming part of the separator 12. The hand retainer 14 is adapted to retain a hand, such as a gloved hand 42 shown in FIG. 9. The hand retainer 14 may have a first part 40 that is C-shaped to receive hand 42. The hand retainer 14 may also have a second part 44 that is C-shaped to receive hand 42. A hand retainer receives or restrains a hand 42, without requiring the user to flex or grip the gloved hand 42. Continual flexing and unflexing of a user's hand while wearing rubber gloves may lead to fatigue and injury. A suitable hand retainer 14 may use a rigid restraint, such as a clip or first part 40 that acts as a shoulder for the hand to push against to manipulate or advance the applicator 10. Other hand retainers 14 may have a flexible restraint, such as a strap or cable, with a coupling mechanism such as a buckle, quick coupler, or other for connecting to the hand or connecting to the hand retainer 14 to retain the hand in place.

Velcro™ may be used to secure a strap over a user's hand. In some cases two types of retainers may be used, such as the first and second parts 40 and 40 in combination with a strap that loops around a user's wrist to prevent accidental dropping of the applicator 10 in the electrical power transmission system.

Referring to FIG. 1, retainer 14 may comprise a base 46, which may be shaped to receive the palm of a user's hand (not shown). A first side member 48 may be extended from the base 46, with a first top member 50 extended from the first side member 48 over the base 46. Base 46, side member 48, and top member 50 may be walls as shown, and may collectively form the first part 40. A second side member 52 may be extended from the base 46, with a second top member 54 extended from the second side member 52 over the base 46. Base 46, side member 52, and top member 54 may be walls as shown, and may collectively form the second part 44.

Figure 3:
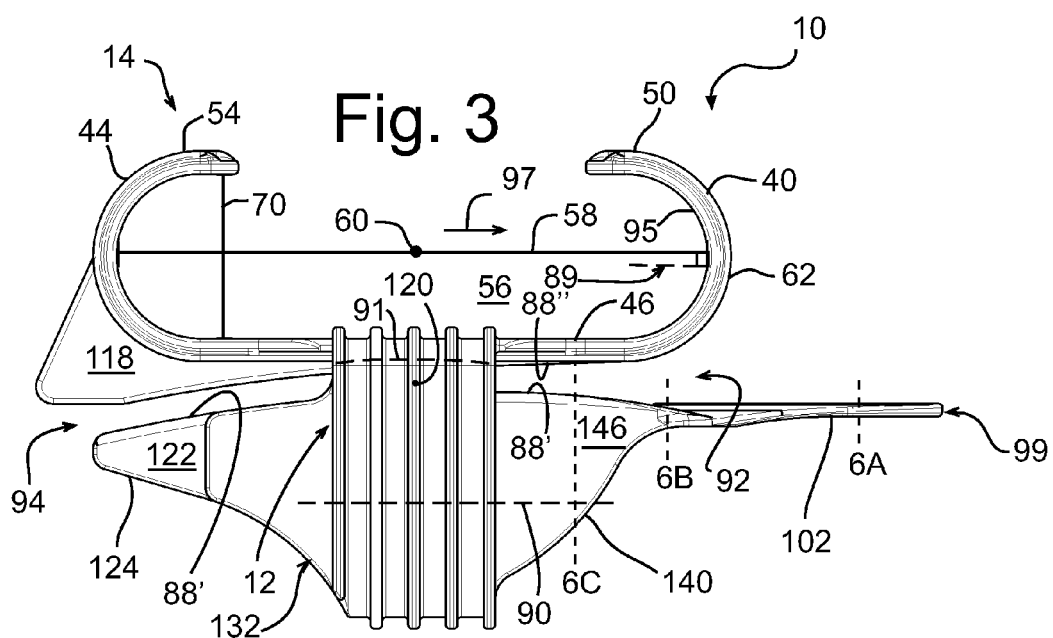
FIG. 3 is a side view of the applicator of FIG. 1.

Referring to FIG. 3, the first part 40 and the second part 44 may be opposed to one another to define a hand gap 56. First and second parts 40 and 44 may thus have a separation distance 58 that corresponds to the width of a user's hand from side to side, or from index to pinky finger. Top members 50 and 54 may also have a separation distance from base 46 selected to fit the width of a user's hand from front (palm) to back. In some cases distances 58 and 70 may be reversed, so that a user's palm or back of the hand faces into the direction of advancement. In other cases first, second, or other parts 40, 44, respectively, may be configured to retain parts of a user's hand, such as one or more fingers. For example one part may retain one or more fingers. Another part may retain one or more other fingers. Fingers include thumbs. Opposition in the example shown refers to the fact that the C-shaped parts 40, 44 face or open up towards each other. In some cases parts 40 and 44 may be adjustable in separation distance 58, 70, or both. For example, parts 40 and 44 may be slidable relative to one another, for example if one such part was mounted on a track. A locking mechanism may secure parts in place once the correct position was obtained. In some cases parts of retainer 14 may rotate relative to one another, for example if one or both parts 40 and 44 were mounted to rotate from an open position inward to a closed position over a user's hand.

Figure 2:
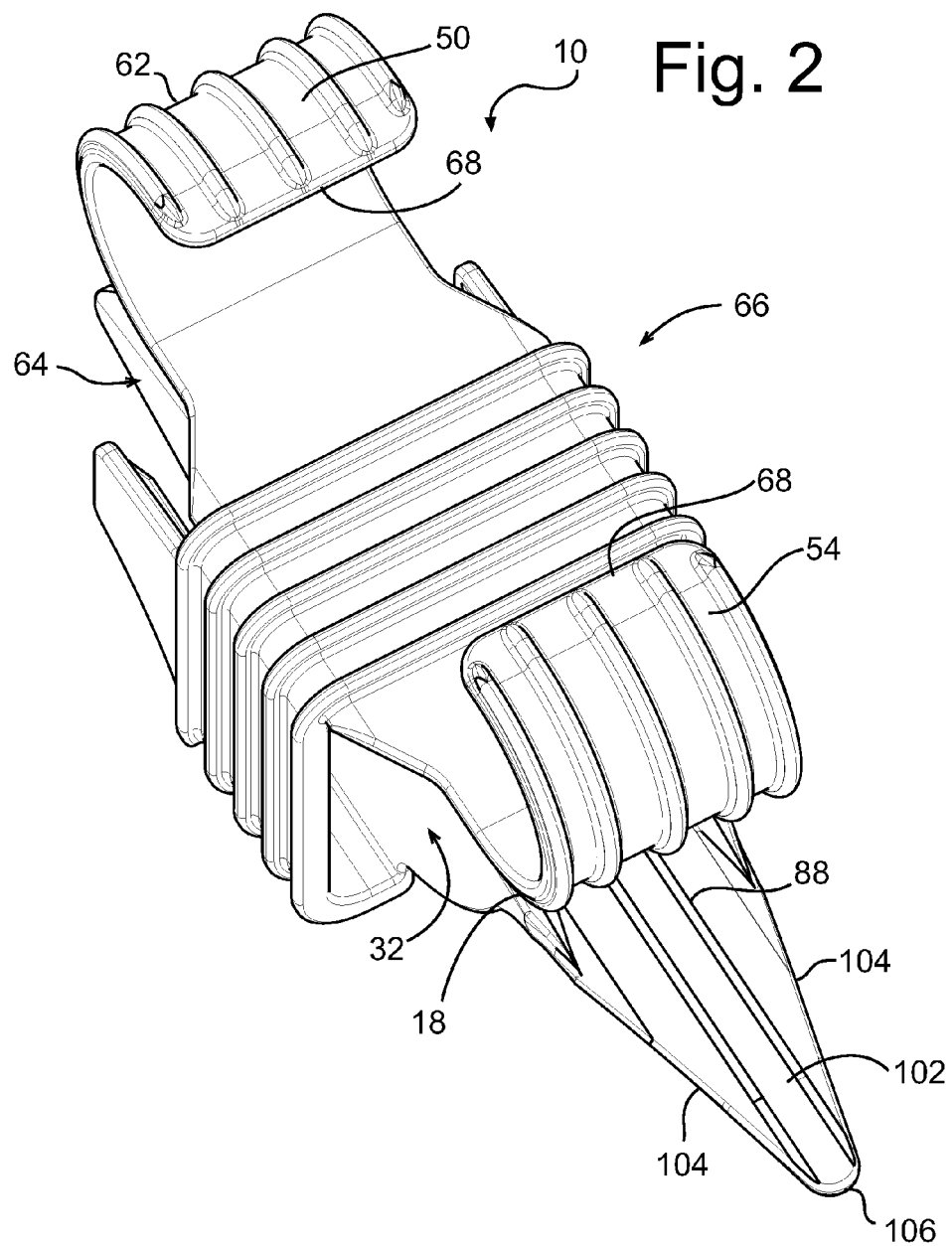
FIG. 2 is a top perspective view of the applicator of FIG. 1.

The hand retainer 14, such as part 40, or both of parts 40 and 44, may define a hand passage axis 60. The hand retainer 14 may comprises one or more members, such as members 46, 48, 50, 52, and 54 that collectively define an open ended hand receptacle 62. Referring to FIGS. 2 and 4 receptacle 62 may have a first end 64 and a second end 66, both of which may be open to permit a user to insert a hand fingers first into receptacle 62 from either end 64 or 66. Referring to FIG. 2, top members 52 and 54 may have terminal ends 68 separated from one another, or top members 52 and 54 may be connected (not shown). Receptacle 62 may have a cylindrical shape, for example with a circular, stadium, oval, box, or other suitable cross section as defined in the plane shown in FIG. 4.

Referring to FIG. 1, hand retainer 14, such as parts 40 and 44, may be reinforced. In the example shown parts 40 and 44 are walls, and reinforcement is achieved using sufficient material thickness, durability, and the addition of ridges 72. Other forms of reinforcement may be used, such as corrugation, rigid material inserts, and others. Ridges 72 on base 46 run parallel to hand passage path or axis 60 (FIG. 3) to reduce friction on a hand entering or leaving the receptacle 62.

Referring to FIG. 4, the separator 12 may have a middle part 74 and two arm parts 76, 78 that extend from the middle part 74. The middle part 74 defines at least part of a base 80 of the U-channel 32 and the two arm parts 76, 78 define at least part of respective arms 82, 84, of the U-channel 32. The hand retainer 14 may be connected to or form part of the middle part 74 as shown. Thus, in use the hand retainer 14 is situated over a middle portion 86 of cover 20 when cover 20 is viewed in lateral cross section as shown. Positioning hand retainer 14 over middle portion 86 may provide more balanced control of applicator 10 than if hand retainer 14 were connected to or part of arm parts 76, or 78, though both such situations may form embodiments of applicator 10. In the example shown the separator elements 18, 19, arm parts 76, 78, and middle part 74 collectively define the U-channel 32.

Referring to FIGS. 1, 2, and 4-6 the separator 12 may comprise features that reduce friction on a cover 20 passing through applicator 10. For example, one or more longitudinal ridges 88 may be provided for contacting the conductor cover 20 and reducing the surface contact area between cover 20 and applicator 10. Ridges 88 may run parallel to an axis or path 91 of conductor cover travel through the applicator 10. The path 91 may be an axis in some cases, if path 91 has straight portions or the entirety of path 91 is straight. Referring to FIG. 4 the ridges 88 may project in a plane or planes perpendicular to a path 91. Referring to FIG. 1 such ridges 88 may extend from a cover entry end 92 to a cover exit end 94 of channel 32.

Referring to FIGS. 3 and 4, the hand retainer 14 may comprise a stop, for example a shoulder such as provided by an interior surface 95 of first part 40. The stop prevents hand movement in a direction 97 from a cover exit end 94 to a cover entry end 99 of the applicator 10, the direction 97 being parallel to the path 91 of conductor cover travel. A theoretical normal line 89 defined by the stop may be parallel to the path 91 of conductor cover travel. Thus, the stop ensures that force applied by a user's hand in direction 97 will cause the applicator 10 to move in a direction parallel to direction 97, while retaining the hand in place. When a hand is positioned in receptacle 62, the hand passage axis 60 may correspond with or run parallel to a hand axis (not shown) that runs from the wrist of a user's hand to the finger tips. In some cases like the one shown the hand passage axis 60, when projected onto a plane, that is parallel to and runs along path 91, forms a non zero angle, such as forty five degrees or more, relative to all or a portion of path 91. The axis 60 may be perpendicular to all or a portion of path 91 in some cases, such as the one shown.

Referring to FIGS. 1-4, applicator 10 may have a tongue 102 positioned at a cover entry end 92 of channel 32. Referring to FIGS. 2 and 6, tongue 102 may have a flat triangular shape with side edges 104 that function as extensions of separating elements 18, 19, originating at channel 32, and moving towards one another with increasing distance from end 92, terminating in a point 106. Instead of straight edges 104, other shapes may be used, such as curved, or straight and curved edges. Referring to FIG. 2, a top surface 108 of tongue 102 may have longitudinal ridges 88 for contacting interior surface 28 of the conductor cover 20 (FIG. 4).

Referring to FIGS. 6, 6A, and 6B, in use the knife point 106 is inserted into the cover 20. As the tongue 102 is advanced into the cover, the edges 104 apply lateral force to interior surface 28 of cover, separating longitudinal edges 22 and 24 so that by the time cover 20 reaches cover entry end 92 (FIG. 6B), the edges 22 and 24 have been separated sufficiently to fit within channel 32. Referring to FIGS. 6A-B, the tongue 102 may form a first part 142, of a channel entry portion of the applicator 10, that acts as a wedge to spread conductor cover 20 apart horizontally. Edges 104 push in opposite lateral directions against interior surface 28 of cover 20 to spread cover arms 141 relative to one another. Initially, edges 104 push against a lead axial edge 143 (FIG. 9) of cover 20. Referring to FIGS. 6, 6B, and 6C, once the conductor cover 20 reaches the widest portion of the tongue 102 (FIG. 6B), a pair of leading guide edges 140 of separator elements 18, 19, begin to cause each edge 22 and 24 of the conductor cover 20 to uncurl (FIG. 6C). The guide edges 140 act as a second part 144 (FIG. 6), of the channel entry portion of the applicator 10, that acts as a wedge to spread conductor cover 20 apart vertically. Horizontal and vertical spreading actions are understood to be defined relative to one another and not with reference to absolute vertical or horizontal. The first part 142 may be sized, at the transition (FIGS. 6B-C) between first and second parts 142 and 144, to permit edges 22 and 24 of cover 20 to wrap underneath tongue 102. Thus, when vertical force is applied against the interior 28 of cover 20 (FIG. 6C) from the partially unwrapped position at the transition, the force spreads the edges 22 and 24 downward to unfurl. While edges 140 are unfurling the edges 22 and 24, ridges 88 begin to flatten the middle portion 86 of cover 20 to obtain the square or rectangular U-shape of channel 32 (FIG. 4). First and second parts 142 and 144 thus provide two motions that allow the conductor cover to attain the correct shape in order for the cover to pass through the tool and be properly aligned and recoiled once the cover contacts the wire.

Referring to FIGS. 3, 6, and 6C, the structure of edges 140 may be defined as follows. Separator elements 18, 19 comprise upwardly extending plates 122 that define longitudinal ridges 88'. Plates 122 are extended from arm parts 76 and 78 (FIG. 4). Referring to FIG. 3, a portion 146 of each plate 122 extends at or near cover entry end 92 and extends from a portion 125 (FIG. 4) of each plate 122, each portion 125 depending from a respective arm part 76 or 78. Referring to FIG. 3, each portion 146 is cantilevered from portions 125 towards cover entry end 92 in a direction parallel to a cable insertion axis 90 in cable passage 132 defined by channel 32. Referring to FIGS. 3, 6, and 6C portions 146 have lower guide edges 140 about which longitudinal edges 22 and 24 of cover 20 (FIG. 6C) unwrap around as cover 20 enters channel 32. Referring to FIG. 3, to assist in the unwrapping of cover 20 passing through entry end 92, lower edges 140 are shaped to move away from longitudinal ridges 88' with increasing distance from cover entry end 92 in a direction along path 91 (path 91 is discussed in more detail below). Thus, each plate 122 acts on a respective cover arm 141, by pushing in opposite vertical directions against interior surface 28 of each arm 141 relative to that arm. Initially, edges 140 contact leading axial edge 143 (FIG. 9) of cover 20. The last contact between edges 140 and cover 20 occurs when guide edges 140 slide downward along interior surface 28 or axial edge 143 to contact cover edges 22 and 24 to complete the uncurling, after which the uncurled cover 20 enters channel 32. In the example shown each guide edge 140 is curved with plural inflection points. Curved edge portions, straight edge portions, or a combination of straight and curved edge portions, may be used for the profile of edges 140. Such structure permits a gradual as opposed to an immediate unwrapping of cover 20 and thus encourages proper uncurling of edges 22 and 24.

Referring to FIG. 6, once tongue 102 terminates at cover entry end 92 of channel 32, separator 12 defines a cable access opening 110 between separator elements 18, 19, along the length of the channel 32 to the cover exit end 94 of channel 32. Within opening 110, elements 18, 19 may be separated by a separation distance 112 sufficient to fit a cable 26 (not shown). Thus, a cable 26 may come into contact with interior surface 28 of cover 20 along the portion of the cover 20 that is opened up within the applicator 10. In other cases, separator elements 18, 19 may extend across opening 110 and connect to one another.

Referring to FIG. 3, path 91 may have the shape of a hump. The hump path may have a peak (not shown) located within U-channel 32. In the example shown the hump path is defined from cover entry end 92 to cover exit end 94, and is defined by middle part 74 and separator elements 18, 19. Specifically, referring to FIGS. 3 and 5, longitudinal ridges 88' of separator elements 18, 19, and ridges 88" of middle part 74 define the hump path 91 for cover 20 to follow as it passes through applicator 10. As above, at cover exit end 94 the series of downward extending plates 118 define longitudinal ridges 88"', which are curved or angled downward from peak 120 of the hump profile to force cover 20 downward towards cable 26 (not shown) as cable 26 enters and leaves cover exit end 94 of applicator 10. The hump profile may be partially defined by tongue 102, for example if the hump path is formed from end 99 to end 94. The hump path permits cover 20 to move up on entry into applicator 10, level out, and then move down upon exit from applicator 10 onto cable 26 (not shown). The hump path also causes a flattening effect on cover 20 at peak 120 due to bending of cover 20.

Referring to FIGS. 3 and 5, as above separator elements 18, 19 comprise upwardly extending plates 122 that define longitudinal ridges 88'. Plates 122 are extended from arm parts 76 and 78 (FIG. 4). Referring to FIG. 5, a portion 123 of each plate 122 extends at or near cover exit end 94 and extends from a portion 125 of each plate 122, each portion 125 depending from a respective arm part 76 or 78. Referring to FIG. 3, each portion 123 is cantilevered from portions 125 towards cover exit end 94 in a direction parallel to a cable insertion axis 90 in cable passage 132 defined by channel 32. Portions 123 thus have lower edges 124 about which longitudinal edges 22 and 24 of cover 20 (not shown) are free to wrap around as cover 20 exits applicator 10. To assist in the wrapping of cover 20 out exit end 94, lower edges 124 move towards longitudinal ridges 88' with decreasing distance towards cover exit end 94 in a direction along path 91. In the example shown lower edges 124 are curved, but straight edges, or a combination of straight and curved edges, may be used. Such structure permits a gradual as opposed to an immediate wrapping of cover 20 and thus encourages proper wrapping of edges 22 and 24. Ridges are separated by grooves.

Figure 7:
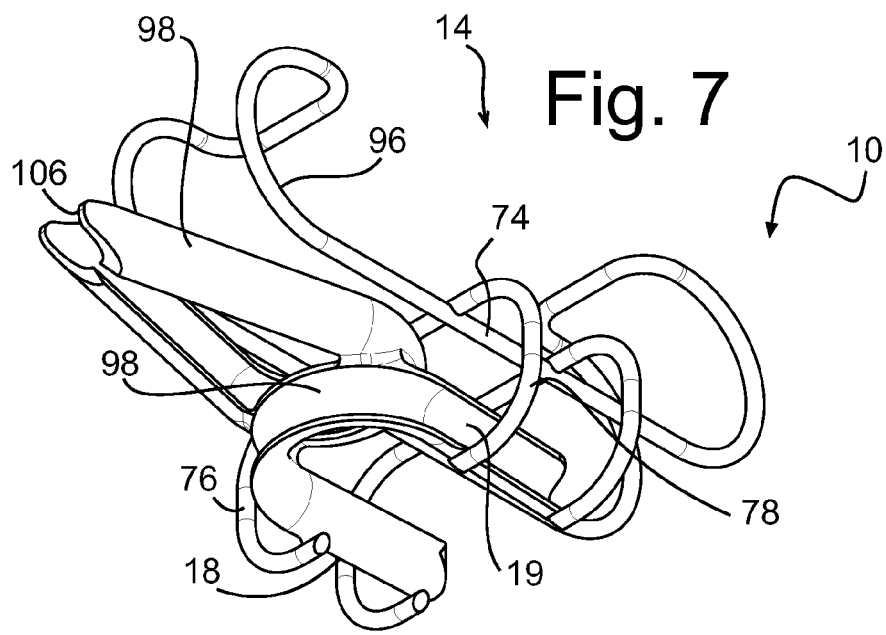
FIG. 7 is a bottom perspective view of another embodiment of a conductor cover applicator.

Referring to FIG. 7 another embodiment of an applicator 10 is shown, constructed of wire loops 96 for retainer 14, middle part 74 and arm parts 76, 78, and bent channel pieces 98 for separator elements 18 and 19. The channel pieces 98 receive in use the longitudinal edges 22 and 24 of the cover 20, and may be formed by tubes cut in half along the length of the tube. Channel pieces 98 may form tongue 102, and may be beveled to form knife point 106.

Referring to FIGS. 9-17, a method of installing tubular conductor cover 20 over a cable 26 is illustrated. Referring to FIG. 9, in a first stage a hand, such as index, ring, middle, and pinky fingers, collectively fingers 126, of a gloved hand 42, is positioned in hand retainer 14. In this case the sides of the hand are defined by the index and pinky finger. Positioning the hand in the hand retainer 14 may comprise inserting the hand 42 along hand insertion axis 60 into the open-ended hand receptacle 62 formed by C-shaped first and second parts 40, 44. Hand retainer 14 retains hand 42 without requiring flexing of hand 42, thus reducing user fatigue from use.

Figure 10:
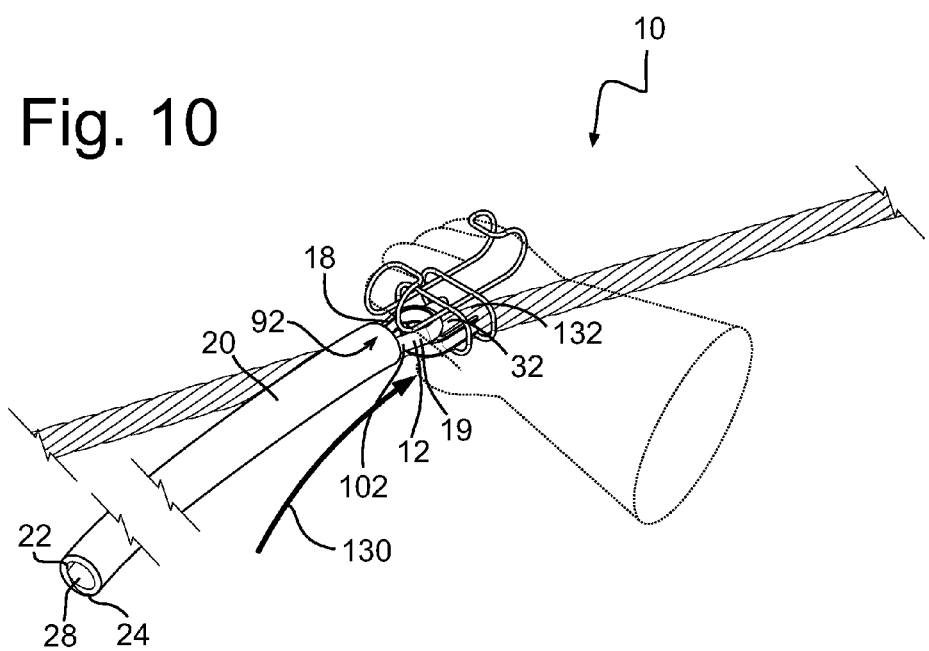
Figure 11:
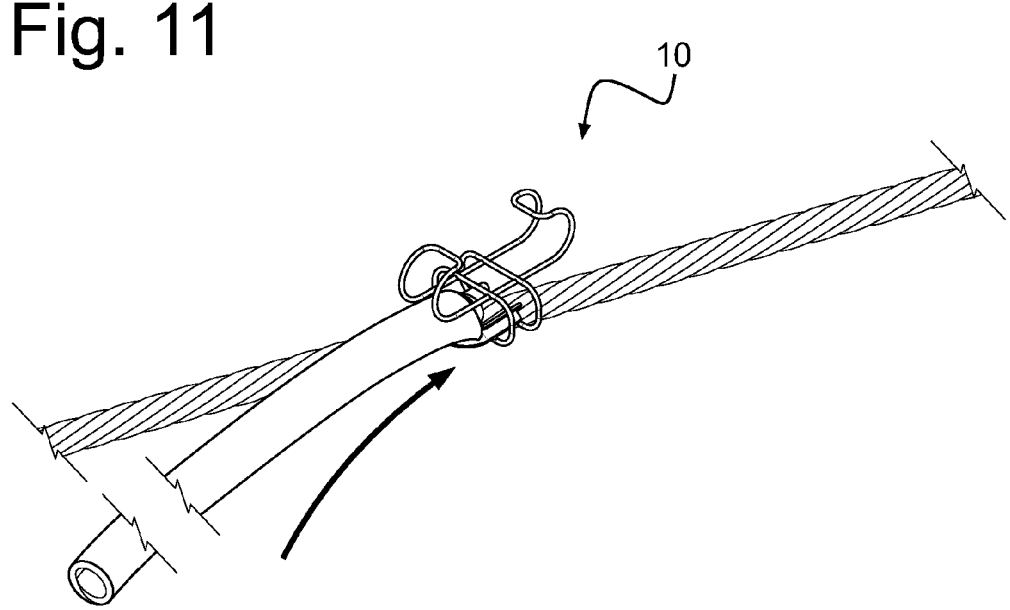
Figure 12:
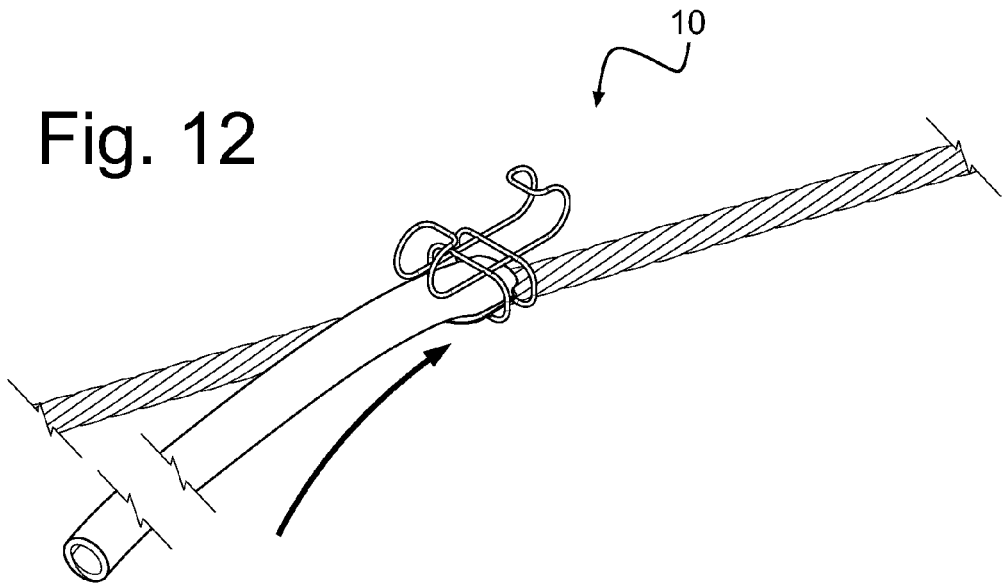
Figure 13:
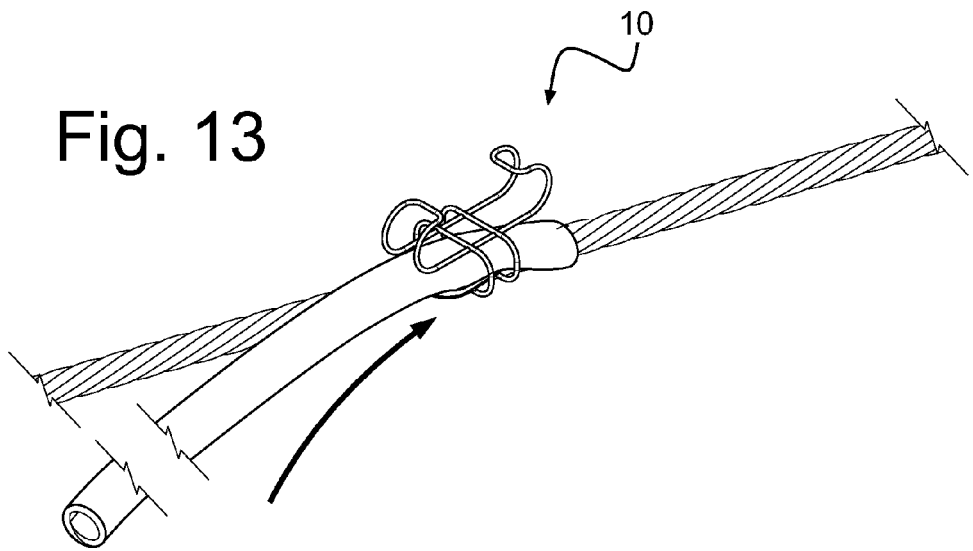
Figure 14:
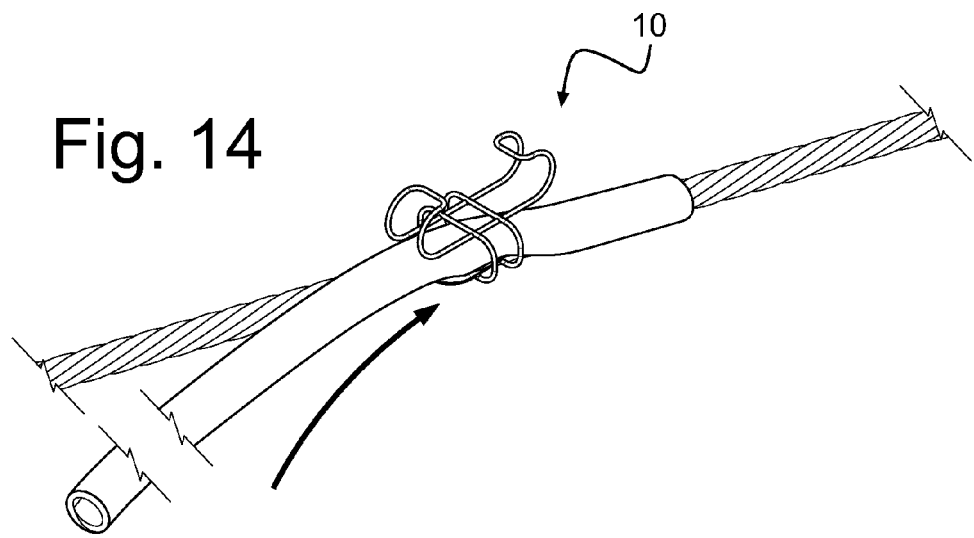

Referring to FIGS. 9-10, the first longitudinal edge 22 and the second longitudinal edge 24 of a portion 25 of the conductor cover 20 are spread open with a separator 12, for example a pair of separating elements 18, 19 of the separator 12. The separating elements 18, 19, may contact interior surface 28 of the conductor cover 20. To spread open the cover 20, cover 20 is inserted into applicator 10 in a direction 130 parallel to path 91, onto tongue 102, and into cover entry end 92 of channel 32 (FIG. 10).

Referring to FIG. 10, applicator 10 may be positioned over a cable 26 to ensure that the cable 26 is located sufficiently adjacent to the interior surface 28 of the portion 25 of cover 20. In this fashion, cable 26 is indirectly positioned or inserted for example through a cable passage 132 defined by channel 32. Referring to FIGS. 10-14 a length of conductor cover 20 is applied to the cable 26 through the applicator 10, for example by pushing the cover 20 through separator 12 along path 91. The length of conductor cover 20 desired may be supplied from a conductor cover supply (not shown). The conductor cover 20 may be cut to the desired length before, after, or during the application of the length of conductor cover 20. Cover 20 may be cut to length using utility snips (not shown) for example. The conductor cover 20 may be secured to the cable 26 using fasteners (not shown), for example after a length of cover 20 is applied.

Figure 15:
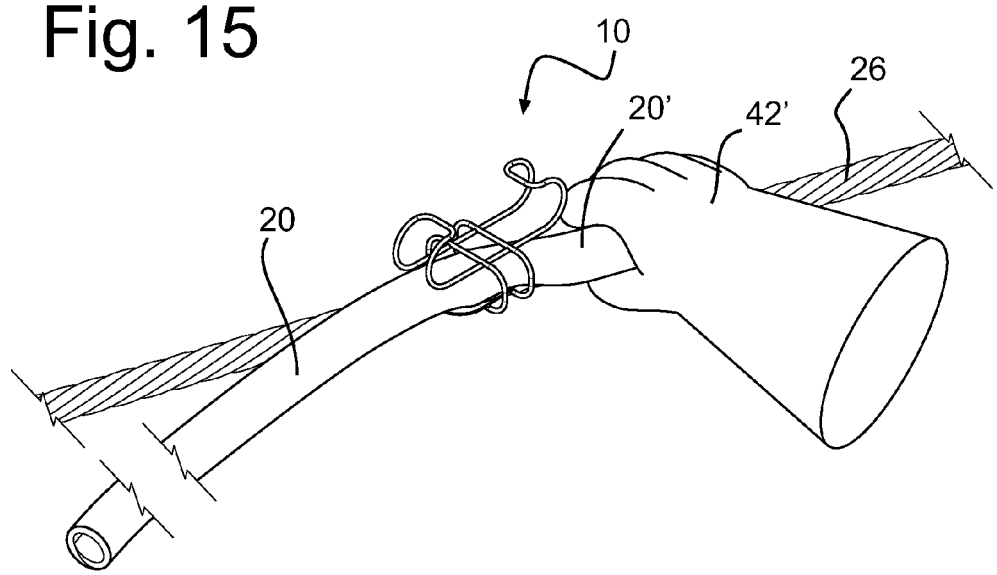
Figure 16:
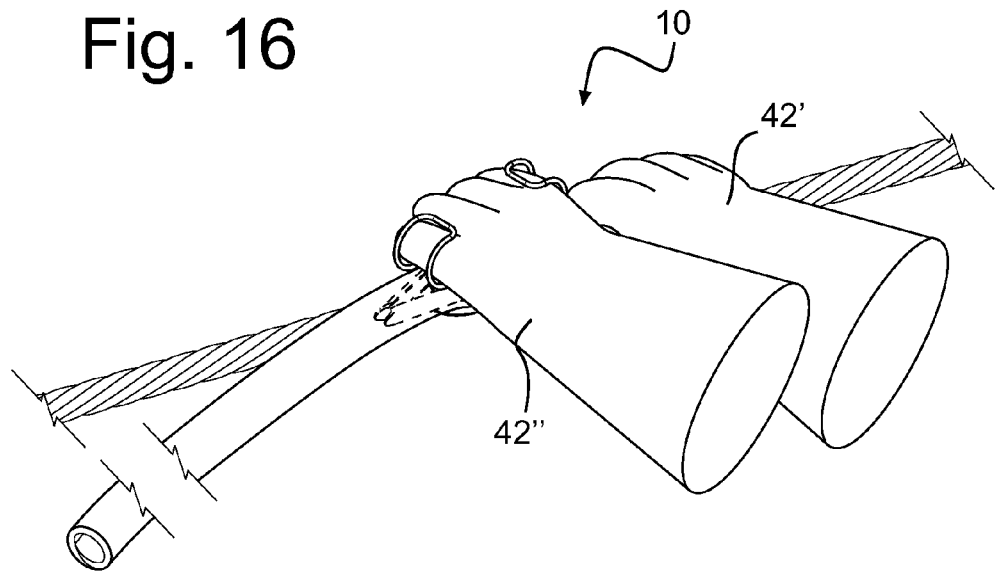
Figure 24:
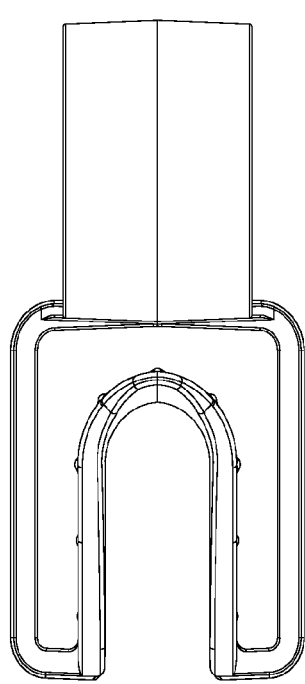
FIG. 24 is an end view of the entry end of the conductor cover applicator of FIG. 20.
Figure 25:
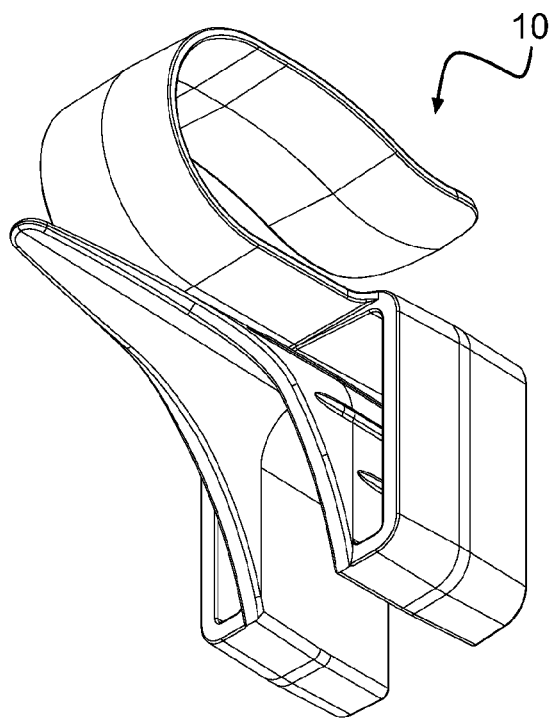
FIGS. 25 and 26 are perspective of the bottom of the conductor cover applicator of FIG. 20.
Figure 26:
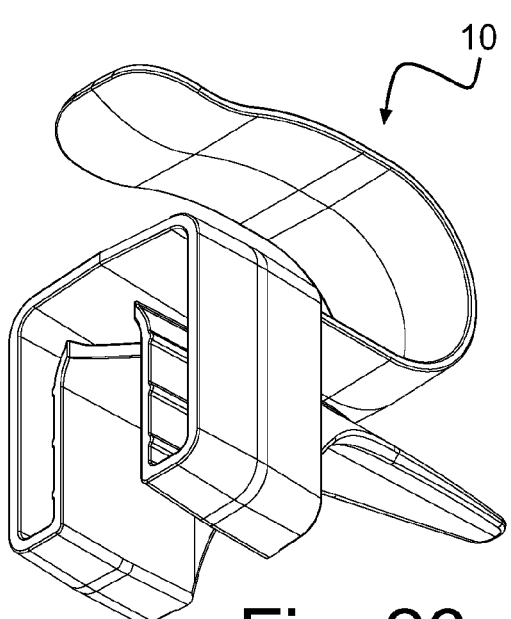
Figure 27:
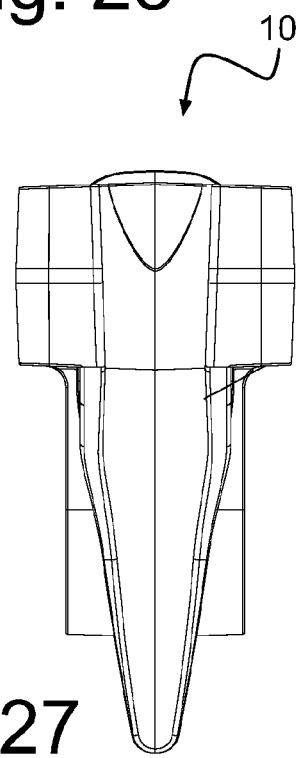
FIG. 27 is a bottom plan view of the conductor cover applicator of FIG. 20.

Referring to FIG. 15, once a sufficient amount of cover 20 is applied to cable 26, a user may position a first hand 42' over the applied portion of cover 20', to hold the cover 20' in place on the cable 26. In other cases the applied portion of cover 20' may be fastened to cable 26, for example using a clamp or clip. Referring to FIGS. 16 and 17, the user may then use a second hand 42" to apply further conductor cover 20 upon cable 26. Second hand 42" may be the same or a different hand as was positioned in hand retainer 14 during application of portion of cover 20'. Application of further conductor cover 20 may be accomplished by moving hand 42" away from applied cover portion 20', while keeping cable 26 within cable passage 132 (FIG. 10). A sliding motion may be used. Application of cover 20 may thus be accomplished using primarily a user's arm strength, as opposed to finger or hand strength.

Referring to FIG. 9, the methods disclosed here may include application of cover 20 to a cable 26 in a live energized electrical power transmissions system as shown. The cable 26 itself may be energized during application. The user, or at least the user's hand 42, may be positioned within the Standard limits of approach, such as limit of approach 136A. Such limits are generally set by the IEEE for live electrical systems. It should be understood that the limits of approach may vary according to region. The limits of approach around energized equipment generally widens as the voltage increases. The limits of approach 136A-C correspond to increasing voltages and thus increasing radii from 136A to 136C. When the user is positioned within a safe limit of approach, such as limit of approach 136C, the user may be required by law to wear protective clothing.

Figure 30:
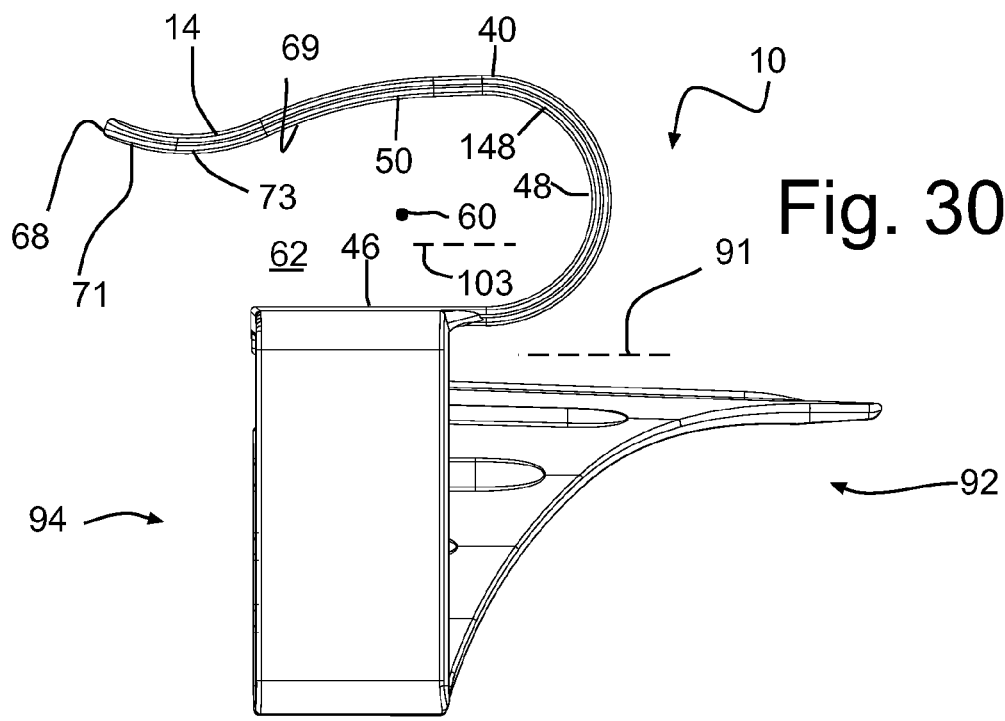
FIG. 30 is a side elevation view of the conductor cover applicator of FIG. 28.

Referring to FIGS. 23 and 30, two respective embodiments are illustrated of a conductor cover applicator 10 with a hand retainer 14 that has a first part 40 but no second part 44. Referring to FIG. 30, top member 50 is shaped to form a clip for a user's hand (not shown). Thus, as top member 50 extends towards terminal edge 68, the top member has a part 69 that curves or otherwise extends toward base 46 or a plane defined by base 46. The top member 50 may reach an inflection point 73 at which point a ramp part 71 of the member 50 curves or otherwise extends away from base 46 or a plane defined by base 46. The first part 40 may be provided to permit a user's hand (not shown) to enter or exit the hand receptacle 62 along an axis 103 parallel to the path 91 of conductor cover travel. As the user's hand enters the first part 40 along axis 103, the hand contacts the ramp part 71 and moves the top member 50 away from base 46 against the biasing force of the top member 50 and side member 48, which may both comprise resilient material.

Once the hand reaches side member 48, and in some cases clears the inflection point 73, the top member 50 may relax, but even if the member 50 is not permitted to return to an initial unbiased position, the top member 50 creates either a stop against hand removal or a frictional grip upon the user's hand. Upon removal of the hand, the hand may press against part 69, which may form a ramp itself, and press the top member 50 away from the base 46 to permit exit of the user's hand. Alternatively, the user may remove his or her hand by movement along the hand passage axis 60, which may be defined perpendicular to direction 97. The interior surfaces 148 of the first part 40 may be smooth without ridges to avoid catching on gloves during insertion or removal of a user's hand. The applicator 10 illustrated permits a user to switch between left and right hands into and out of the retainer 14 with relative ease.

Figure 28:
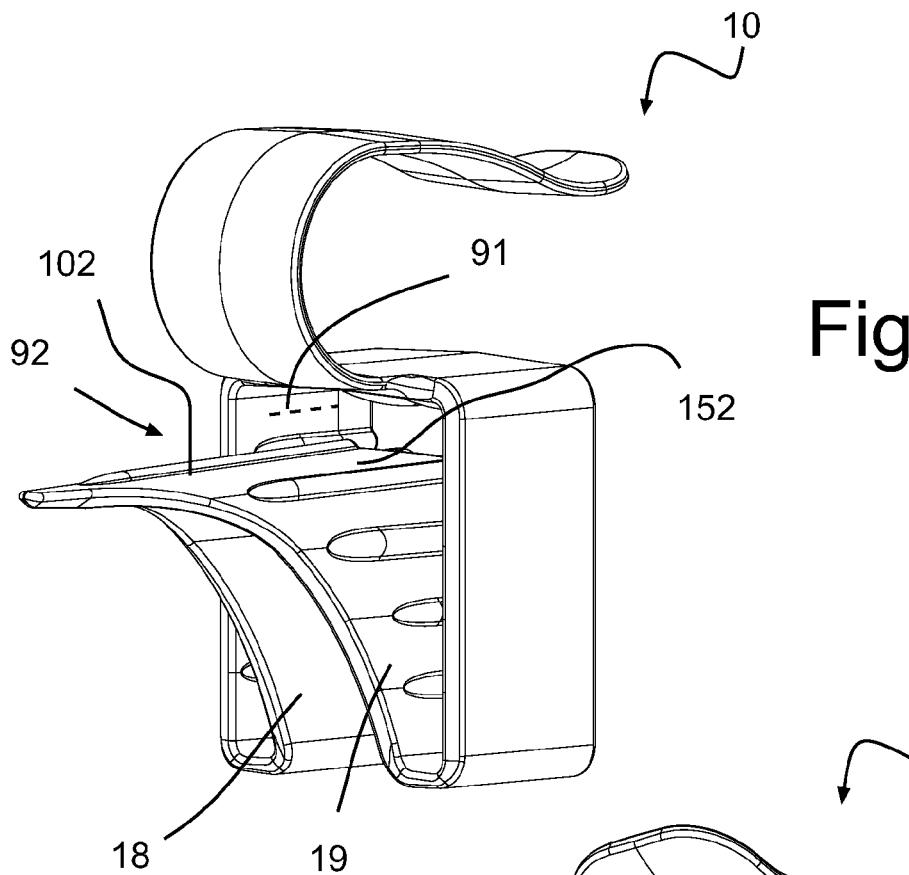
FIG. 28 is a side perspective view of a further embodiment of a conductor cover applicator.
Figures 31, 32:
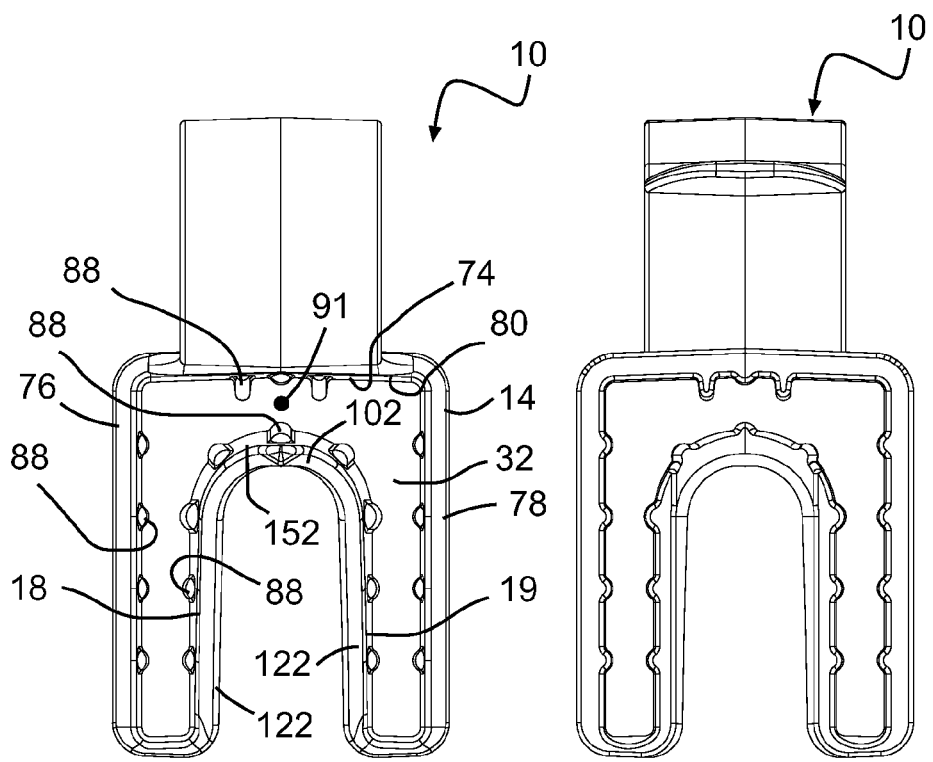
FIGS. 31 and 32 are end views of the entry and exit ends, respectively, of the conductor cover applicator of FIG. 28.

Referring to FIGS. 28 and 31, the conductor cover facing surfaces of the tongue 102, at least part of the separator elements 18 and 19, and a bridge 152 may be collectively defined along a U-shaped or curved profile that extends from the cover exit end 94 to the tongue 102. Thus, when viewed down the axis 91 of conductor cover travel (FIG. 31), the tongue 102, elements 18 and 19, and bridge 152 appear to define a uniform U-shape. All surfaces of head 14 may have a convex shape in all planes defined parallel to the axis 91. Convex means that no line drawn parallel to the axis 91 along a plane defined parallel to the axis 91 will enter and exit the interior or exterior walls of the head 14 more than once. Such structure assists in molding the applicator 10, as the head 14 may be molded by two mold parts that can be pulled apart from one another along the axis 91. By contrast, concavities in such planes increase the complexity of the manufacturing process. The top member 50 forms a concavity (FIG. 30), but may be able to be pulled out from the simple mold described above due to the resiliency of the top member 50.

Figure 29:
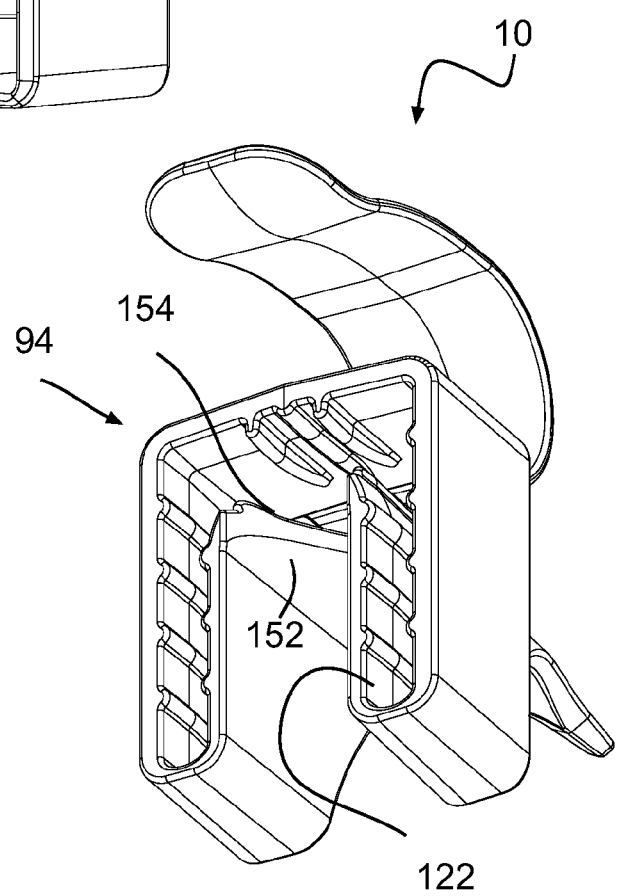
FIG. 29 is a perspective view of the base of the conductor cover applicator of FIG. 28.

Referring to FIG. 29, bridge 152 may define a cut out or indented portion 154 at or adjacent cover exit end 94. Portion 154 facilitates contact between the cable 26 (not shown) and cover 20 within or soon after exiting the applicator 10. Referring to FIGS. 29 and 30, applicator 10 may lack cantilevered portions 123 of plates 122, in order to reduce the length of the applicator 10 along axis 91, hence reducing the friction acting upon the cover 20 while cover 20 is within applicator 10. Referring to FIG. 31, friction may be further reduced by the use of longitudinal grooves 88 on the plates 122, arm parts 76 and 78, bridge 152, middle part 74.

In some embodiments a hot stick (not shown) may be used with applicator 10. A hot stick is made with a dielectric material, to prevent transmission of electricity from a working end to a user operated end of the hot stick. A hot stick allows the conductor cover 20 to be applied to an energized cable 26 by a user outside the limits of approach, despite the fact that the cable 26 is within the limits of approach. In some cases a handle may be present on applicator 10. The handle may be made of dielectric material, for example if the handle is a dielectric shaft. For energized applications that use dielectric material, the material used is rated dielectric material that has passed an industry standard test. The applicator 10 may have a hot stick connector (not shown), for example connected to hand retainer 14, to allow a user to use a combination of hand and hot stick methods to apply conductor cover 20 across a long span of cable 26. The hot stick connector may include a loop or hook, for example so that a clamp stick may be used to remotely operate the applicator 10. In such cases, a user may begin the application process by hand (FIGS. 9-17), and once the application point becomes out of reach for the user, a hot stick may be connected to the hot stick connector and used to operate the applicator 10 remotely.

In some cases the applicator 10 may comprise lubricant (not shown) to reduce friction of the cover 20 through the separator 12. Suitable lubricant may be dielectric lubricant to avoid short circuits in the event the lubricant drips onto adjacent equipment. A dispenser (not shown) may be provided to dispense lubricant on the cover as the cover passes through the separator 12, or lubricant may be manually applied to the cover before application. In some cases the surfaces of applicator 10 that contact the cover 20 in use may be smooth, for example polished, to reduce friction.

One or more rollers may be used to reduce friction of cover through the applicator. For example, each separator element 18 and 19 may comprise a roller or roller system. The middle part 74 may comprise a roller. The roller may include a cylindrical, spherical, or other form of roller. Toothed rollers, such as gears, or wheels may be used. Low friction surfaces may be used or coated upon applicator 10 to reduce friction. The rollers or roller elements may be coated with lubricant to reduce friction. Some or all rollers may be driven, for example by gear, track, hydraulic, belt, pulley, or chain and sprocket drives, for some examples, or by other drive systems. Other drive systems may be used to draw, push, or pull the cover 20 through the applicator 10, with or without rollers. The roller surface may be configured to grip the cover, for example using texturing or contouring to minimize slippage between the conductor cover and the applicator and cover. The rollers may contact the interior surface 28 of the cover 20. The rollers may have axes perpendicular to a cable insertion axis. The rollers or separating elements 18, 19 may be biased into contact with the cover 20. The rollers may be concave or convex across a cover contact area.

The channel 32 need not be U-shaped, for example if the channel 32 was defined only by middle part 74, separator elements 18, and 19 connected to one another and only one or arm parts 76 or 78. In some cases the channel has a W-shape. A U-shape includes a C-shape. Spacers or adjustable depth arm parts 76, 78 may be used to adjust the size of the channel 32 for different sizes of conductor covers 20. The cover exit end 94 may be configured to prevent the edges 22 or 24 of cover 20 from curling in upon themselves during the application process. A universal tie stick or other type of hook (not shown) may be run longitudinally through the conductor cover 20 after application to unhook any improperly curled edges 22 or 24 to ensure proper closure. A hot stick may be used to guide the conductor cover 20 into the applicator 10. Axes discussed here may be defined by averaging points on a path. In some cases the hand retainer 14 may pivot, for example about an axis (not shown) perpendicular to base 46 to allow repositioning of the hand retainer 14 before or during application.

Referring to FIGS. 18 and 19, various dimensions of conductor cover 20 were tested against an applicator 10 with channel width 200 and channel height 202 dimensions. The comparison and ratios of such dimensions are shown below in Tables 1 and 2.

TABLE 1

Comparison of conductor cover width 204 when uncurled, channel width 200, and channel height 202

| Cover width 204 | Cover width/ channel width 200 (1.56") | Cover width/ channel height 202 (2.2") |
| --- | --- | --- |
| 4.13" | 2.647436 | 1.877273 |
| 4.92" | 3.153846 | 2.236364 |
| 5.51" | 3.532051 | 2.504545 |

TABLE 2

Comparison of conductor cover diameter when curled, channel width 200, and channel height 202

| Cover diameter | Cover diameter/ channel width 200 (1.56") | Cover diameter over channel height 202 (2.2") |
| --- | --- | --- |
| 0.75" | 0.480769 | 0.340909 |
| 1" | 0.641026 | 0.454545 |
| 1.25" | 0.801282 | 0.568182 |

In various embodiments, there may be included any one or more of the following: The separator comprises a roller element having a roller surface for contacting and guiding the conductor cover through the separator in operation. The roller surface may comprise conductor cover gripping element. The applicator may have a biasing mechanism for biasing the roller element towards the conductor cover in use. The applicator may have an actuator lever for advancing and retracting the roller element towards and away from, respectively, the cover in use. The roller surface may be positioned for contacting an exterior surface of the conductor cover to hold the portion of the conductor cover against the separator. The roller surface may be one or more of at least partially concave or at least partially convex. The roller surface may be positioned for contacting the interior surface of the portion of conductor cover. At least one roller element may be connected for rotation to a drive system for one or both of driving and pulling the conductor cover through the separator. A drive system may be present for one or both of driving and pulling the conductor cover through the separator. The drive system may comprise a drive shaft made at least partially out of dielectric material. The separator and the separator may define a channel contoured to fit the portion of the conductor cover. The channel may be a U or W-channel. The channel may comprise one or more spacer elements. One or more spacer elements may be adjustable. The channel may be shaped to impart reverse curl on one or more of the first longitudinal edge and the second longitudinal edge at a cover exit end of the separator. The applicator may have a handle for positioning the separator. The handle may comprise a hot stick stock made at least partially of a dielectric material. The separator may be one or more of connected to, pivotally connected to, and suspended from, the handle. The separator may converge inwardly to define a wedge element for spreading the first longitudinal edge and the second longitudinal edge apart during axial movement of the conductor cover through the separator. The separator may comprise two or more separating elements spaced to contact the interior surface of the conductor cover. A cable passage may be at least partially defined by the separator. A gate may be provided, the gate having an at least partially closed position and being shaped to guide, when in the at least partially closed position, the first longitudinal edge at least partially across the cable passage and under or over the second longitudinal edge as the conductor cover exits the applicator. The gate may comprise one or more cover edge guide ridges for restricting the first longitudinal edge from curling back on itself. The gate may be biased to close or partially close in the presence of the conductor cover. The gate may comprise one or more cover edge guide ridges. One or more of the cover edge guide ridges may be angled across the cable passage with increasing distance across the cable passage towards an exit end of the gate. The gate may be a first gate and the applicator may further comprise a second gate having an at least partially closed position and being shaped to guide, when in the at least partially closed position, the second longitudinal edge at least partially across the cable passage as the conductor cover exits the applicator, in which the first gate and the second gate overlap when in the respective at least partially closed positions. A cover exit guide may be provided for in use pressing the conductor cover towards the cable upon exit from the applicator. The cover guide may comprise a roller element. The applicator may be provided in combination with a hot stick tool for maintaining control over a free portion of the conductor cover positioned upstream of the applicator in use. The cover may be provided in combination with conductor cover that is split longitudinally to have an overlapping portion defined by the first longitudinal edge and the second longitudinal edge. The separator may converge inwardly at a cover exit end of the separator for closing the first longitudinal edge and the second longitudinal edge together about the cable during axial movement of the conductor cover through the separator. Applying may comprise rolling the conductor cover through the separator using one or more roller elements. The conductor cover may be secured to the cable using fasteners. The separator may be connected to a handle that comprises a hot stick made at least partially of a dielectric material, and in which applying comprises applying the conductor cover to an energized cable by a user outside the limits of approach. Applying may comprise one or more of driving and pulling the conductor cover through the separator. Applying may comprise guiding the separator along the cable. The cover may be clamped against the separator or another part of the applicator prior to application. The applicator may comprise a handle for positioning the separator. The handle may comprise a hot stick stock made at least partially of a dielectric material. The hot stick may be for applying conductor cover to energized cable outside of the limits of approach. A roller element may be provided on the separator with a roller surface for contacting an outer surface of the conductor cover to hold the portion of the conductor cover against the separator and for guiding the conductor cover through the separator. The separator may be constructed wholly or partially of a dielectric material. The separator may comprise two or more separating elements spaced to contact the interior surface of the conductor cover. The separator may comprise a roller element having a roller surface for contacting and guiding the conductor cover through the separator in operation. The roller element may comprise one or more roller elements, the roller surface of at least one roller element being positioned for contacting an outer surface of the conductor cover to hold the portion of the conductor cover against the separator, and the roller surface of at least another roller element being positioned for contacting the interior surface of the portion of conductor cover. Rollers positioned in series along path 91 may be connected by gear and sprocket to rotate in the same direction.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
   a cable that is part of an electrical power transmission system; and
   an applicator for applying a tubular conductor cover to the cable, the conductor cover being split longitudinally to define a first longitudinal edge and a second longitudinal edge, the applicator comprising:
   a separator shaped to contact, in operation of the applicator, an interior surface of the conductor cover to spread open the first longitudinal edge and the second longitudinal edge along a portion of the conductor cover to allow the portion of the conductor cover to be applied to the cable; and
   a hand retainer extending from the separator;
   with an applied portion of the conductor cover on the cable, and the spreader contacting and spreading open the first longitudinal edge and the second longitudinal edge of the conductor cover.

2. The apparatus of claim 1 in which the hand retainer comprises a base, a first side member extended from the base, and a first top member extended from the first side member over the base.

3. The apparatus of claim 2 in which the hand retainer comprises a second side member extended from the base, and a second top member extended from the second side member over the base, the second side member being spaced from the first side member to define a hand gap.

4. The apparatus of claim 1 in which the hand retainer has a first part that is C-shaped to receive a hand.

5. The apparatus of claim 4 in which the hand retainer has a second part that is C-shaped to receive the hand.

6. The apparatus of claim 5 in which the first part and the second part are opposed to one another to define a hand gap.

7. The apparatus of claim 4 in which the separator defines a path of conductor cover travel, and the hand retainer comprises a stop that prevents hand movement in a direction from a cover exit end to a cover entry end of the applicator, the direction being parallel to the path of conductor cover travel.

8. The apparatus of claim 7 in which a line defined as a normal to a surface of the stop is parallel to the path of conductor cover travel.

9. The apparatus of claim 1 in which the hand retainer comprises one or more members that define an open ended hand receptacle.

10. The apparatus of claim 1 in which the separator defines a U-channel contoured to fit the portion of the conductor cover, and the separator comprises a middle part and two arm parts that extend from the middle part, the middle part defining at least part of a base of the U-channel and the two arm parts defining at least part of respective arms of the U-channel, the hand retainer extending from the middle part.

11. The apparatus of claim 1 in which the separator comprises longitudinal ridges for contacting the conductor cover.

12. The apparatus of claim 1 in which the cable is energized.

13. The apparatus of claim 1 in which the conductor cover forms a wildlife and weather barrier on the cable.

14. A method of applying tubular conductor cover to a cable, the conductor cover being split longitudinally to define a first longitudinal edge and a second longitudinal edge, the method comprising:
 positioning a hand in a hand retainer extending from a separator;
 spreading open the first longitudinal edge and the second longitudinal edge of a portion of the conductor cover with a separator, the separator contacting an interior surface of the conductor cover;
 applying a length of conductor cover to the cable through the separator; and
 in which the cable is part of an electrical power transmission system.

15. The method of claim 14 in which the hand retainer comprises a base, a first side member extended from the base, and a first top member extended from the first side member over the base.

16. The method of claim 15 in which the hand retainer comprises a second side member extended from the base, and a second top member extended from the second side member over the base, the second side member being spaced from the first side member to define a hand gap.

17. The method of claim 14 in which the hand retainer has a first part that is C-shaped to receive a hand.

18. The method of claim 17 in which the hand retainer has a second part that is C-shaped to receive a hand.

19. The method of claim 17 in which the first part and the second part are opposed to one another to define a hand gap.

20. The method of claim 14 in which the hand retainer comprises one or more members that define an open ended hand receptacle, and in which positioning a hand in the hand retainer further comprises inserting the hand into the open ended hand receptacle.

21. The method of claim 20 in which the separator defines a path of conductor cover travel, and the hand retainer comprises a stop that prevents hand movement in a direction from a cover exit end to a cover entry end of the applicator, the direction being parallel to the path of conductor cover travel.

22. The method of claim 21 in which a line defined as a normal to a surface of the stop is parallel to the path of conductor cover travel.

23. The method of claim 14 in which the cable is energized.

24. The method of claim 14 in which the conductor cover forms a wildlife and weather barrier on the cable.

* * * * *